(12) United States Patent
Singh et al.

(10) Patent No.: US 12,387,720 B2
(45) Date of Patent: Aug. 12, 2025

(54) NEURAL SENTENCE GENERATOR FOR VIRTUAL ASSISTANTS

(71) Applicant: SoundHound, Inc., Santa Clara, CA (US)

(72) Inventors: Pranav Singh, Sunnyvale, CA (US); Keyvan Mohajer, Los Gatos, CA (US); Yilun Zhang, Toronto (CA)

(73) Assignee: SoundHound AI IP, LLC., Santa Clara, CA (US)

( * ) Notice: Subject to any disclaimer, the term of this patent is extended or adjusted under 35 U.S.C. 154(b) by 765 days.

(21) Appl. No.: 17/455,727

(22) Filed: Nov. 19, 2021

(65) Prior Publication Data

US 2022/0165257 A1 May 26, 2022

Related U.S. Application Data

(60) Provisional application No. 63/198,912, filed on Nov. 20, 2020.

(51) Int. Cl.
*G10L 15/18* (2013.01)
*G06F 40/284* (2020.01)
(Continued)

(52) U.S. Cl.
CPC ........ *G10L 15/1822* (2013.01); *G06F 40/284* (2020.01); *G06F 40/30* (2020.01);
(Continued)

(58) Field of Classification Search
CPC ..... G10L 15/22; G10L 15/1822; G06F 40/30; G06F 40/35; G06F 40/284
See application file for complete search history.

(56) References Cited

U.S. PATENT DOCUMENTS 8,812,316 B1 8/2014 Chen
10,452,782 B1 * 10/2019 Kumar ................. G06F 40/295
(Continued)

FOREIGN PATENT DOCUMENTS

EP 3486842 A1 5/2019
WO 2018200979 A1 11/2018

OTHER PUBLICATIONS

Li, Zichao, et al., "Decomposable neural paraphrase generation." arXiv preprint arXiv:1906.09741 (Year: 2019).*

(Continued)

*Primary Examiner* — Samuel G Neway
(74) *Attorney, Agent, or Firm* — Platinum Intellectual Property PC

(57) ABSTRACT

Methods and systems for automatically generating sample phrases or sentences that a user can say to invoke a set of defined actions performed by a virtual assistant are disclosed. By enabling finetuned general-purpose natural language models, the system can generate potential and accurate utterance sentences based on extracted keywords or the input utterance sentence. Furthermore, domain-specific datasets can be used to train the pre-trained, general-purpose natural language models via unsupervised learning. These generated sentences can improve the efficiency of configuring a virtual assistant. The system can further optimize the effectiveness of a virtual assistant in understanding the user, which can enhance the user experience of communicating with it.

23 Claims, 10 Drawing Sheets

(51) Int. Cl.

| | |
|---|---|
| *G06F 40/30* | (2020.01) |
| *G06F 40/35* | (2020.01) |
| *G10L 15/02* | (2006.01) |
| *G10L 15/06* | (2013.01) |
| *G10L 15/22* | (2006.01) |

(52) U.S. Cl.
CPC ............ *G06F 40/35* (2020.01); *G10L 15/02* (2013.01); *G10L 15/063* (2013.01); *G10L 15/22* (2013.01)

(56) References Cited

U.S. PATENT DOCUMENTS

| | | | |
|---|---|---|---|
| 10,515,155 B2 | 12/2019 | Bachrach et al. | |
| 11,394,799 B2 † | 7/2022 | Jackson | |
| 11,580,959 B2 | 2/2023 | Freed et al. | |
| 2002/0082833 A1 | 6/2002 | Marasek et al. | |
| 2002/0133340 A1 | 9/2002 | Basson et al. | |
| 2006/0129381 A1 | 6/2006 | Wakita | |
| 2006/0195318 A1 | 8/2006 | Stanglmayr | |
| 2007/0033026 A1 | 2/2007 | Bartosik et al. | |
| 2007/0208567 A1 | 9/2007 | Amento et al. | |
| 2010/0106505 A1 | 4/2010 | Shu | |
| 2011/0218802 A1 | 9/2011 | Bouganim et al. | |
| 2012/0059838 A1 | 3/2012 | Berntson et al. | |
| 2013/0018649 A1* | 1/2013 | Deshmukh | G06F 40/56 704/9 |
| 2015/0179169 A1 | 6/2015 | John et al. | |
| 2016/0155436 A1 | 6/2016 | Choi et al. | |
| 2016/0180242 A1 | 6/2016 | Byron et al. | |
| 2016/0196820 A1* | 7/2016 | Williams | G10L 15/1822 704/244 |
| 2017/0161373 A1 | 6/2017 | Goyal et al. | |
| 2017/0200458 A1 | 7/2017 | Kang et al. | |
| 2017/0286869 A1* | 10/2017 | Zarosim | G06N 5/025 |
| 2018/0061408 A1* | 3/2018 | Andreas | G10L 15/22 |
| 2018/0068653 A1 | 3/2018 | Trawick et al. | |
| 2018/0121419 A1* | 5/2018 | Lee | G06F 40/56 |
| 2018/0329883 A1* | 11/2018 | Leidner | G06F 40/30 |
| 2019/0108257 A1 | 4/2019 | Lefebure et al. | |
| 2019/0147104 A1 | 5/2019 | Wu et al. | |
| 2019/0155905 A1 | 5/2019 | Bachrach et al. | |
| 2019/0251165 A1 | 8/2019 | Bachrach et al. | |
| 2019/0278841 A1 | 9/2019 | Pusateri et al. | |
| 2019/0370323 A1 | 12/2019 | Davidson et al. | |
| 2020/0004787 A1* | 1/2020 | Gupta | G06F 40/58 |
| 2020/0034357 A1 | 1/2020 | Panuganty et al. | |
| 2020/0065334 A1 | 2/2020 | Rodriguez et al. | |
| 2020/0142888 A1* | 5/2020 | Alakuijala | G06F 16/242 |
| 2020/0142959 A1* | 5/2020 | Mallinar | G06N 20/20 |
| 2020/0143247 A1 | 5/2020 | Jonnalagadda et al. | |
| 2020/0167379 A1 | 5/2020 | Faruqui et al. | |
| 2020/0334334 A1* | 10/2020 | Keskar | G06N 3/084 |
| 2021/0042614 A1 | 2/2021 | Walters et al. | |
| 2021/0056266 A1* | 2/2021 | Ma | G06F 16/353 |
| 2021/0110816 A1* | 4/2021 | Choi | G10L 15/063 |
| 2021/0118436 A1 | 4/2021 | Kim et al. | |
| 2021/0141798 A1 | 5/2021 | Henderson | |
| 2021/0141799 A1 | 5/2021 | Steedman Henderson | |
| 2021/0142164 A1* | 5/2021 | Liu | G06F 40/216 |
| 2021/0142789 A1 | 5/2021 | Gurbani et al. | |
| 2021/0149993 A1* | 5/2021 | Torres | G06N 3/045 |
| 2021/0151039 A1 | 5/2021 | Wu et al. | |
| 2021/0209304 A1 | 7/2021 | Yang et al. | |
| 2021/0264115 A1 | 8/2021 | Wang et al. | |
| 2021/0397610 A1 | 12/2021 | Singh et al. | |
| 2022/0004717 A1 | 1/2022 | Park et al. | |
| 2022/0059095 A1 | 2/2022 | Faria et al. | |
| 2022/0093088 A1* | 3/2022 | Rangarajan Sridhar | G06F 16/338 |
| 2022/0165257 A1* | 5/2022 | Singh | G10L 15/1822 |
| 2022/0215159 A1* | 7/2022 | Qian | G06F 40/40 |
| 2023/0044079 A1 | 2/2023 | Bala | |
| 2023/0143110 A1 | 5/2023 | Han et al. | |
| 2023/0186898 A1 | 6/2023 | Weisz et al. | |
| 2023/0245649 A1 | 8/2023 | Singh et al. | |
| 2023/0401251 A1 | 12/2023 | Majkowska et al. | |

OTHER PUBLICATIONS

U.S. Appl. No. 17/455,727, filed Nov. 19, 2021, Ranav Singh.

Agnihotri, Souparni. "Hyperparameter Optimization on Neural Machine Translation." (2019).

Cer, Daniel, Yinfei Yang, Sheng-yi Kong, Nan Hua, Nicole Limtiaco, Rhomni St John, Noah Constant et al. "Universal Sentence Encoder for English." EMNLP 2018 (2018): 169.

Hashemi, Homa B., Amir Asiaee, and Reiner Kraft. "Query intent detection using convolutional neural networks." In International Conference on Web Search and Data Mining, Workshop on Query Understanding. 2016.

Karagkiozis, Nikolaos. "Clustering Semantically Related Questions." (2019).

Klein, Guillaume, François Hernandez, Vincent Nguyen, and Jean Senellart. "The OpenNMT neural machine translation toolkit: 2020 edition." In Proceedings of the 14th Conference of the Association for Machine Translation in the Americas (AMTA 2020), pp. 102-109. 2020.

Kriz, Reno, Joao Sedoc, Marianna Apidianaki, Carolina Zheng, Gaurav Kumar, Eleni Miltsakaki, and Chris Callison-Burch. "Complexity-weighted loss and diverse reranking for sentence simplification." arXiv preprint arXiv:1904.02767 (2019).

Lin, Ting-En, Hua Xu, and Hanlei Zhang. "Discovering new intents via constrained deep adaptive clustering with cluster refinement." In Proceedings of the AAAI Conference on Artificial Intelligence, vol. 34, No. 05, pp. 8360-8367. 2020.

OpenNMT, Models—OpenNMT, https://opennmt.net/OpenNMT/training/models/.

Reimers, Nils, and Iryna Gurevych. "Sentence-bert: Sentence embeddings using siamese bert-networks." arXiv preprint arXiv:1908.10084 (2019).

Vaswani, Ashish, Noam Shazeer, Niki Parmar, Jakob Uszkoreit, Llion Jones, Aidan N. Gomez, Lukasz Kaiser, and Illia Polosukhin. "Attention is all you need." arXiv preprint arXiv:1706.03762 (2017).

Wang, Peng, Bo Xu, Jiaming Xu, Guanhua Tian, Cheng-Lin Liu, and Hongwei Hao. "Semantic expansion using word embedding clustering and convolutional neural network for improving short text classification." Neurocomputing 174(2016): 806-814.

Xu, Jiaming, Bo Xu, Peng Wang, Suncong Zheng, Guanhua Tian, and Jun Zhao. "Self-taught convolutional neural networks for short text clustering." Neural Networks 88 (2017): 22-31.

Lewis, Mike, Yinhan Liu, Naman Goyal, Marjan Ghazvininejad, Abdelrahman Mohamed, Omer Levy, Ves Stoyanov, and Luke Zettlemoyer. "Bart: Denoising sequence-to-sequence pre-training for natural language generation, translation, and comprehension." arXiv preprint arXiv:1910.13461 (2019).

Shaw, Andrew. "A multitask music model with bert, transformer-xl and seq2seq."

Geitgey, A. "Faking the News with Natural Language Processing and GPT-2." Medium. Sep. 27, 2019.

Rajapakse, T. "To Distil or Not to Distil: BERT, ROBERTa, and XLNet" towardsdatascience.com. Feb. 7, 2020.

Radford, Alec, Jeffrey Wu, Rewon Child, David Luan, Dario Amodei, and Ilya Sutskever. "Language models are unsupervised multitask learners." OpenAI blog 1, No. 8 (2019): 9.

Zheng, Renjie, Mingbo Ma, and Liang Huang. "Multi-reference training with pseudo-references for neural translation and text generation." arXiv preprint arXiv:1808.09564 (2018).

Juraska, Juraj, and Marilyn Walker. "Characterizing variation in crowd-sourced data for training neural language generators to produce stylistically varied outputs." arXiv preprint arXiv:1809.05288 (2018).

Zhang, Yaoyuan, Zhenxu Ye, Yansong Feng, Dongyan Zhao, and Rui Yan. "A constrained sequence-to-sequence neural model for sentence simplification." arXiv preprint arXiv:1704.02312 (2017).

Wen, Tsung-Hsien, Milica Gasic, Nikola Mrksic, Lina M. Rojas-Barahona, Pei-Hao Su, David Vandyke, and Steve Young. "Multi-

(56) References Cited

OTHER PUBLICATIONS domain neural network language generation for spoken dialogue systems." arXiv preprint arXiv:1603.01232 (2016).
Tran, Van-Khanh, and Le-Minh Nguyen. "Semantic refinement gru-based neural language generation for spoken dialogue systems." In International Conference of the Pacific Association for Computational Linguistics, pp. 63-75. Springer, Singapore, 2017.
Dyer, Chris, Adhiguna Kuncoro, Miguel Ballesteros, and Noah A. Smith. "Recurrent neural network grammars." arXiv preprint arXiv:1602.07776 (2016).
Li, Zichao, Xin Jiang, Lifeng Shang, and Qun Liu. "Decomposable neural paraphrase generation." arXiv preprint arXiv:1906.09741 (2019).
Guu, Kelvin, Tatsunori B. Hashimoto, Yonatan Oren, and Percy Liang. "Generating sentences by editing prototypes." Transactions of the Association for Computational Linguistics 6 (2018): 437-450.
Vaswani, Ashish, Noam Shazeer, Niki Parmar, Jakob Uszkoreit, Llion Jones, Aidan N. Gomez, Łukasz Kaiser, and Illia Polosukhin. "Attention is all you need." In Advances in neural information processing systems, pp. 5998-6008. 2017.
Wen, Tsung-Hsien, Milica Gašic, Nikola Mrkšic, Lina M. Rojas-Barahona, Pei-Hao Su, David Vandyke, and Steve Young. "Toward multi-domain language generation using recurrent neural networks." In NIPS Workshop on Machine Learning for Spoken Language Understanding and Interaction. 2015.
Lebret, Rémi, Pedro O. Pinheiro, and Ronan Collobert. "Simple image description generator via a linear phrase-based approach." arXiv preprint arXiv:1412.8419 (2014).
Vinyals, Oriol, Alexander Toshev, Samy Bengio, and Dumitru Erhan. "Show and tell: A neural image caption generator." In Proceedings of the IEEE conference on computer vision and pattern recognition, pp. 3156-3164. 2015.
Extended European Search Report of EP21180858.9 by EPO dated Apr. 5, 2022.
Examination Report by EPO of European counterpart patent application No. 21180858.9, dated Sep. 10, 2024.
JPO office action of counterpart JP patent application No. 2021-103263, dated Dec. 24, 2024.
KIPO office action of counterpart Korean patent application No. 2021-0080973, dated Jan. 24, 2025.

\* cited by examiner
† cited by third party

NEURAL SENTENCE GENERATOR FOR VIRTUAL ASSISTANTS

CROSS-REFERENCES TO RELATED APPLICATIONS

This application claims the benefit of U.S. Provisional Patent Application No. 63/198,912, entitled "Expanding the Natural Language Understanding of a Virtual Assistant by Unsupervised Learning," filed Nov. 20, 2020, which is incorporated herein by reference for all purposes.

TECHNICAL FIELD

The present subject matter is in the field of artificial intelligence systems and Automatic Speech Recognition (ASR). More particularly, embodiments of the present subject matter relate to methods and systems for neural sentence generation models.

BACKGROUND

In recent years, voice-enabled virtual assistants have become widely accepted because they provide a natural interface for human-machine communication. As a natural mode of human communication, voice control offers many benefits over traditional computer interfaces such as a keyboard and mouse. For example, various virtual assistants, such as an Amazon Alexa, a Google Home, or an Apple HomePod, can understand a user's voice queries and respond with voice answers or actions. In addition, virtual assistants with other interfaces, such as the traditional text interface in a chatbot, can understand a user's text questions and respond with answers or actions.

To enable a virtual assistant to function in a specific environment, the developers or users often use a configurable software development framework to create actions or tasks for the virtual assistant. For example, Amazon's Alexa Skills Kit allows the user to create Skills, or a set of actions or tasks, that are accomplished by Alexa. As a result, the virtual assistant, e.g., Alexa, can understand the user's voice commands and trigger identified actions or tasks.

However, to complete actions requested by a user, the virtual assistant device needs to understand every possible way a user might say to describe the same request. In other words, for a given request, a developer needs to define all possible ways a user can say to describe it. This creates a unique challenge as there are endless ways to describe one request in natural human language. As a result, the virtual assistant often fails to recognize or handle a request that is slightly different from a standard or defined way of describing it.

SUMMARY OF THE INVENTION

The following specification describes many aspects of neural sentence generators for virtual assistants and example embodiments that illustrate some representative combinations with optional aspects. Some examples are systems of process steps or systems of machine components for automated transcription of a conversation. These can be implemented with computers that execute software instructions stored on non-transitory computer-readable media.

The present subject matter describes improved approaches to automatically generate potential sample phrases or utterances that a user can say to invoke a set of defined actions, i.e., an intent, performed by the virtual assistant. According to some embodiments, neural network language models can be trained to generate such phrases or utterances via unsupervised learning.

These thoroughly-generated sample utterance sentences can improve the efficiency of configuring a virtual assistant by saving a developer's effort to imagine, write and verify every possible way a user can say to describe a specific query. In addition, as these numerous sample utterance sentences have been vetted by a trained neural network model, e.g., a classifier model, they can substantially improve the accuracy and effectiveness of a virtual assistant in understanding a user's spoken quest. As a result, the virtual assistant can correctly interpret the users' requests, from which the proper responses and actions are generated.

Furthermore, by rendering a more intelligent virtual assistant that can understand various ways of describing the same query, the present subject matter can significantly enhance the user experience of a virtual assistant.

A computer implementation of the present subject matter comprises: receiving an utterance sentence corresponding to a customized user intent for a virtual assistant, extracting one or more keywords from the utterance sentence to represent the customized user intent, generating, via a sentence generation model, preliminary utterance sentences based on the keywords, generating, via a classifier model, sample utterance sentences corresponding to the customized user intent based on the preliminary utterance sentences, and configuring a voice interaction model of the virtual assistant with the sample utterance sentences, wherein the sample utterance sentences are supported by the voice interaction model to invoke the customized user intent.

According to some embodiments, a customized user intent can invoke one or more defined actions to be performed by the virtual assistant. An intent can represent actions that can fulfill a user's spoken request, such as booking a cruise ticket, that a user can invoke the virtual assistant to perform. Each intent can invoke a specific action, response, or functionality.

According to some embodiments, the utterance sentence can comprise one or more spoken phrases that a user can speak to invoke the customized user intent. It can be a known sentence that has invokes the customized user intent. The utterance sentence can be associated with a correctness score above an interaction threshold. An example of the utterance sentence is a typical way of describing a query, e.g., "what is the weather in San Diego today?"

According to some embodiments, the utterance sentences can comprise a plurality of known utterance sentences that invoke the specific user intent, e.g., "what is the weather in San Diego today?" "How is the weather in San Diego?" or "Tell me the weather in San Diego."

According to some embodiments, the system can extract one or more keywords from the utterance sentence or sentences based on a keyword extraction model. The keyword extraction model can be a general speech command (keyword) extraction model that extracts important words from the known utterance sentence, e.g., "weather," "today," "San Diego." According to some embodiments, the system can replace at least one keyword with a placeholder representing a specific type of word as an argument, e.g., replacing "San Diego" with a placeholder such as <CITY>. Different types of placeholders can be adopted, such as dates, times, and locations.

According to some embodiments, the sentence generation model can be a general-purpose natural language generation model that is finetuned by associated keywords combined with corresponding utterance sentences. According to some embodiments, the natural language generation model can be finetuned by domain identifiers. Finetuning is the procedure of training a general language model using customized data. As a result of the finetuning procedure, the weights of the original model can be updated to account for the characteristics of the domain data and the task the system is interested in.

According to some embodiments, a general-purpose pre-trained natural language generation (NLG) model can be a transformer-based language models. Examples of such language models can be a BART model, which is a denoising autoencoder for pretraining sequence-to-sequence models. A BART model is a transformer-based model that combines the bidirectional encoder, such as Bidirectional Encoder Representations from Transformers (BERT), with an autoregressive, left-to-right decoder, such as Generative Pretrained Transformer 3 (GPT-3), into one sequence-to-sequence language model. Other examples of the language modes' can be BERT, GPT-2 or other pre-trained language models for generating sentences.

According to some embodiments, a trained or finetuned classifier model can be used to infer probabilities of the correctness of the preliminary utterance sentences for invoking the customized user intent. The classifier model can be trained by positive datasets, negative datasets and/or unlabeled datasets. According to some embodiments, the positive datasets comprise supported utterance sentences combined with the customized user intent, and the supported utterance sentences invoke the customized user intent.

According to some embodiments, the training datasets for the general NLG model and the classifier model can comprise foreign language data, (e.g., French, Spanish, and Chinese, are foreign languages to a general NLG model that was trained on English data). Training with a foreign language can improve the effectiveness of language models in working with languages that do not have a lot of available data.

According to some embodiments, the trained classifier model can compute correctness scores for the preliminary utterance sentences and select a number of preliminary utterance sentences with correctness scores higher than a threshold. According to some embodiments, the threshold value can be empirically predetermined or dynamically adapted.

According to some embodiments, the trained classifier model can further map the selected preliminary utterance sentences to the specific intent to generate the sample utterance sentences, wherein the classifier model has been trained by supported utterance sentences that are known to invoke the intent.

According to some embodiments, the sample utterance sentences can be a number of likely spoken phrases mapped to a customized or specific user intent. They can include as many representative phrases as possible. Each sample utterance sentence can comprise the words and phrases a user can say to invoke a customized or specific intent. Each intent can be mapped to a number of sample utterance sentences. The sample utterance sentences can comprise placeholders, e.g., arguments, representing a specific type of word such as dates, times, and locations.

Another computer implementation of the present subject matter comprises: receiving an utterance sentence corresponding to a customized user intent for a virtual assistant, extracting one or more keywords from the utterance sentence to represent the customized user intent, generating sample utterance sentences based on one or more keywords, wherein the sample utterance sentences are generated by a sentence generation model and selected by a classifier model and configuring the virtual assistant with the sample utterance sentences, wherein the sample utterance sentences can invoke the customized user intent.

Another computer implementation of the present subject matter comprises: obtaining one or more keywords associated with an utterance sentence corresponding to a customized user intent for a virtual assistant, generating sample utterance sentences based on the one or more keywords, wherein the sample utterance sentences are generated by a sentence generation model and selected by a classifier model, and configuring the virtual assistant with the sample utterance sentences, wherein the sample utterance sentences can invoke the intent to support the sample utterance sentences to invoke the customized user intent.

According to some embodiments, the system can comprise a platform interface such as an interaction model that can support the sample utterance sentences to invoke the customized user intent. When the user interface is speech-enabled, a voice interaction model can interpret the sample utterance sentences and determine the corresponding responses or actions. According to some embodiments, the voice interaction model can incorporate and process information such as wake words, utterances, invocation names, intents, and placeholders, all of which are used to map out a user's spoken query. When the user interface is textual, a text interaction model can interpret the sample utterance sentences and determine the corresponding responses or actions with a user via text exchanges.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings and in which.

DETAILED DESCRIPTION

The present subject matter pertains to improved approaches to provide automatically generated sample utterance sentences or phrases that a user can say to invoke an intent by a virtual assistant. Such sample utterance sentences can be generated by a pre-trained neural network sentence generator that is finetuned by customized or specific-purposed datasets. Embodiments of the present subject matter are discussed below with reference to FIGS. 1-10.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for the automatic generation of sample utterance sentences. These can be implemented with computers that execute software instructions stored on non-transitory computer-readable media. Improved systems for transcribing and editing transcripts can have one or more of the features described below.

Figure 1:
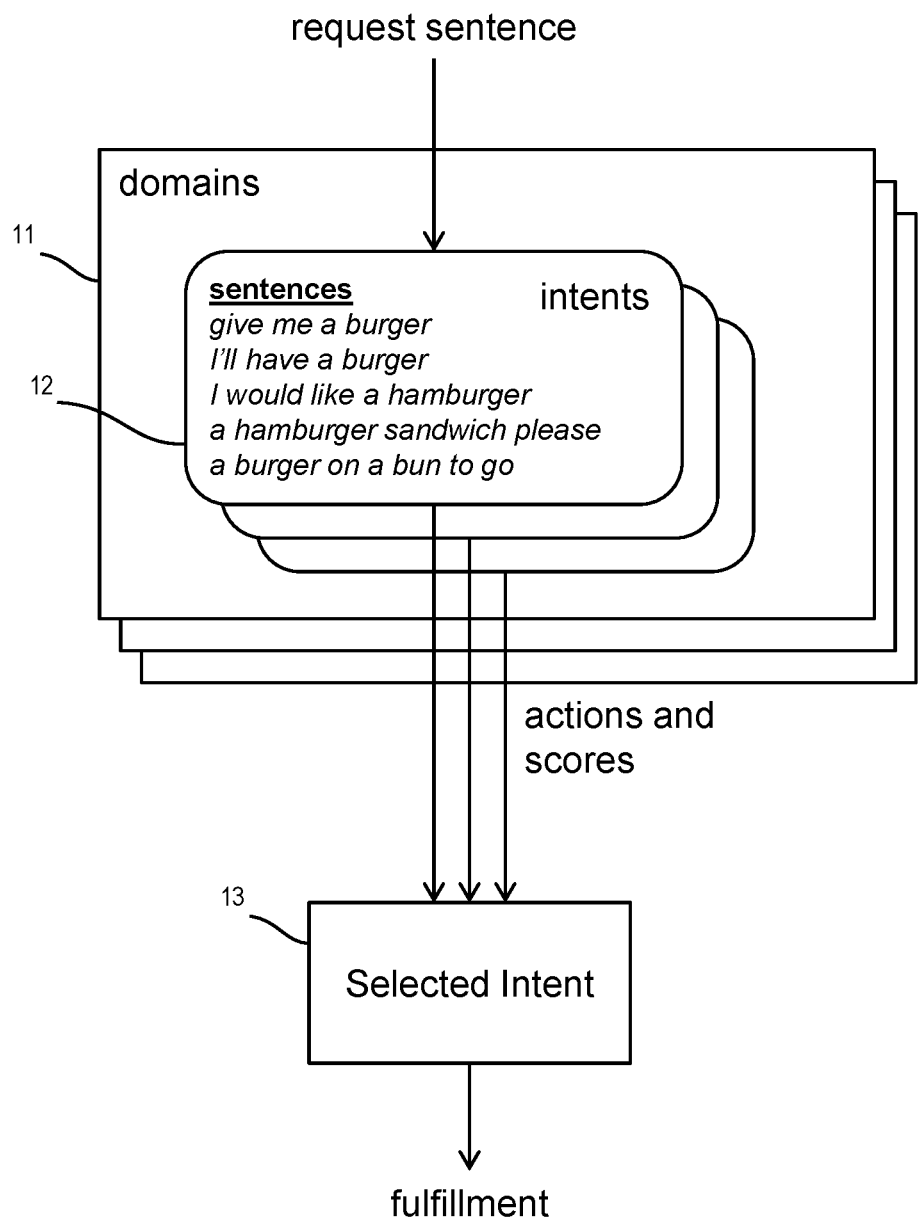
FIG. 1 shows an exemplary functionality of virtual assistant interpretation within domains having multiple intents and associated utterances, according to one or more embodiments of the present subject matter.

FIG. 1 shows an exemplary functionality of virtual assistant interpretation within domains having multiple intents and associated utterances. According to some embodiments, a virtual assistant can be a software agent with a voice-enabled user interface, which can perform tasks or services for a user based on his/her queries or spoken inputs. It can be integrated into different types of devices and platforms. For example, a virtual assistant can be incorporated into smart speakers, e.g., Google's Home, Amazon's Echo, and Apple's HomePod. It can also be integrated into voice-enabled applications for specific companies, e.g., Microsoft's Azure, and IBM's Watson, and SoundHound's Houndify App for its partners.

For example, companies such as SoundHound can offer platforms that provide the infrastructure needed for partner companies to easily create their own application-specific virtual assistants. With such platforms, the developers creating application-specific virtual assistants for partner companies can configure them to handle a broad range of requests addressed by different domains or may configure them to handle a specific set of requests from one or a small number of domains.

FIG. 1 shows exemplary concepts within a virtual assistant that can support multiple applications or domains, such as smart home, E-commerce, travel, etc. It can comprise a plurality of domains 11, each of which can be designed to respond to requests for a specific topic, e.g., a restaurant's order system, an automobile's voice control system. As long as it can "understand" the request sentence spoken by the user, the virtual assistant can support queries that request information and commands that request an action. A virtual assistant for a single application could have as few as just one domain. A broadly-helpful virtual assistant, especially one that can aggregate knowledge from many sources, may have many domains.

According to some embodiments, the plurality of domains 11 can support one or more intents 12. An intent can represent actions that can fulfill a user's spoken request that a user can invoke the virtual assistant to perform. Each intent can invoke a specific action, response, or functionality. For example, an intent can be a query of the current weather forecast, a command to turn on the lights, and an order to purchase an item. An intent can be either a built-in intent that has been predefined by developers or a customized user intent that needs to be specified by a developer.

As a data structure, an intent is a description of the action to be performed. For example, an intent can be specified in a data structure represented in a format such as a JSON schema. According to some embodiments, an intent can comprise placeholders, such as arguments, for collecting variable values to complete the described action or operation.

To invoke an intent, a user must say one or more request sentences called utterance sentences that are supported by the virtual assistant. An utterance sentence is a list of defined phrases or words that invoke a customized or specific user intent. An utterance sentence can comprise one or more spoken phrases that a user can speak to invoke the specific intent. Each intent can be mapped to a number of utterance sentences, all of which need to be provided to the virtual assistant so that it can understand the user's query or command. For example, the sentences "what's the weather," "how is the weather," and "weather conditions" are all different ways for a user to express essentially the same intent, which is a query request for the weather forecast.

More complexity in understanding a user's request sentences can be caused by the context, location, or timing of the spoken requests. For example, a request sentence, "what's the status of London", could be about the weather, airport operations, economic conditions, the standing in a cricket league, or the health of the Detroit Lions linebacker, Antonio London, of the United States National Football League. According to some embodiments, a virtual assistant that can handle more than one intent often has to disambiguate requests that trigger more than one intent as described herein.

According to some embodiments, each utterance sentence can be associated with a likelihood score. The system can provide both the information needed for a virtual assistant to act on an intent and a score that indicates how likely it is that a user meant to trigger the intent. The likelihood scores can vary between different sentences associated with an intent.

According to some embodiments, a virtual assistant can use augmented semantic grammars that define multiple phrasings in a single expression, in contrast to providing simple lists of sentences associated with an intent. Furthermore, sentences associated with virtual assistant intents may have placeholders for words or phrases that refer to specific names or numbers, which can be more efficient than defining a sentence for each variation of a specific phrase.

FIG. 1 shows a virtual assistant diagram that can support an intent for ordering a hamburger, which can be used for an order-taking application at a fast-food restaurant. After one or more intents are asserted with associated likelihood scores, the virtual assistant can determine a selected intent 13 for the fulfillment, which can be any appropriate function or operations such as searching for specific information, performing a request, or sending a message to a device to cause it to perform an action.

Figure 2:
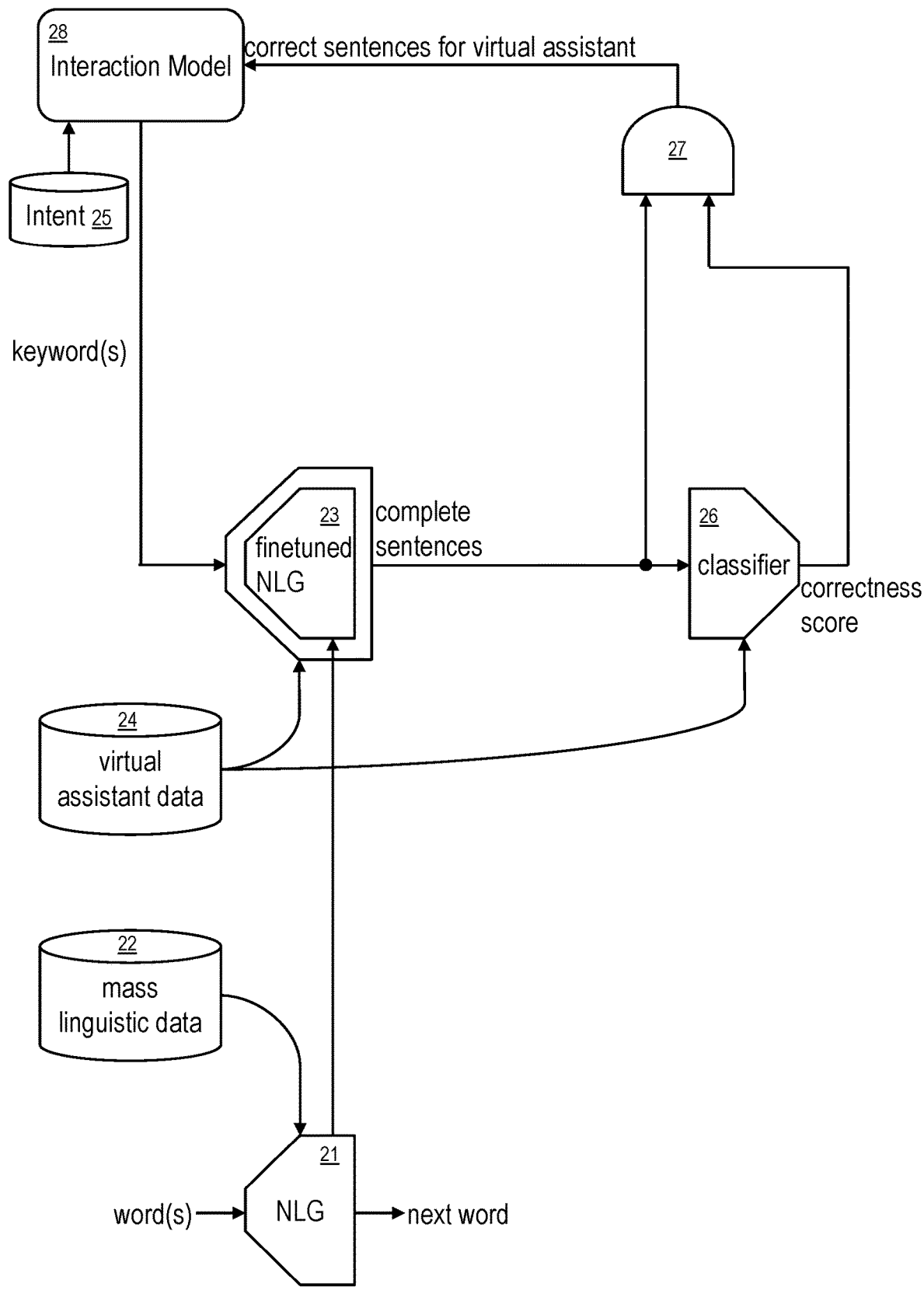
FIG. 2 shows an exemplary diagram of generating sample utterance sentences for an intent, according to one or more embodiments of the present subject matter.

FIG. 2 shows an exemplary diagram of generating sample utterance sentences for an intent. Since an intent should be invoked by many possible sentences, it is traditionally a labor-intensive process to manually create, write and evaluate many sample utterance sentences for an intent. Even though generating augmented semantic grammars is more efficient, it nonetheless can require a high level of training and expertise and lots of human time. As such, with either approach, it remains difficult to create a full list of possible spoken phrases a user can say to invoke an intent.

Instead of creating these unlimited ways of utterance sentences by experienced developers, the present subject matter can employ neural network models and machine learning to automate the generation of numerous, thorough, and effective sample utterance sentences to invoke one intent. Generated by finetuned natural language generators and trained classifiers, these sample utterance sentences can have a semantic meaning to invoke the specific intent they were created for.

As shown in FIG. 2, the neural sentence generator system can start with a general-purpose Natural Language Generator (NLG) model 21. A general-purpose NLG model 21 can be trained with a large amount of general textual data so that it can learn the grammatical structures and semantics of a language, which can be used to predict the next word or phrase after a sequence of words or a missing word in a sentence. As such, based on the learned language patterns, the general-purpose NLG model 21 can also generate a complete sentence based on a few keywords. While various general-purpose language models could be adopted, an example can be a neural-network language model called the transformer.

Some transformers that are known for their use in human language translation can also be used to generate natural language sentences. The Generative Pretrained Transformer 2 (GPT-2) is an example of a general-purpose NLG model trained on massive amounts of linguistic data by the OpenAI organization using a large amount of data and computing power. It is available to other companies and organizations as a conditional natural language model. GPT-2 was trained from a WebText corpus of web pages. Hugging Face, for example, offers a Transformer Python package library of pre-trained Transformer-based models. GPT-2 is one such model that can be useful as a general NLG model from which to finetune models for specific purposes such as virtual assistants.

In addition, NLG models can be trained from other linguistic data sources to achieve different linguistic results. For example, an NLG model trained from articles in the New York Times newspaper would produce much more formal sentences than an NLG model trained from Twitter tweets, which tend to have much simpler sentences that follow more lax grammar rules.

A general-purpose NLG model 21 can contain, within its parameters, knowledge of how people use language in general. Some NLG models are specific to one or another human language, such as English, Chinese, Japanese, German, Korean, or French. Some NLG models are generalized to all human languages. They merely represent ways that humans express ideas and can be finetuned to work for individual human languages.

As shown in FIG. 2, the general-purpose NLG model 21 can be finetuned with mass linguistic data 22 that is specific for a domain or an application. Because the general pattern of a language can be different from the specific language used in a particular domain or application, the general-purpose NLG model 21 can be finetuned for its own domain and target purpose.

According to some embodiments, finetuning a language model can be the process of updating parameters of a general-purpose language model to improve accuracy with domain-specific data. The finetuning process can, for example, adjust the weights of the general-purpose NLG model 21 so that the finetuned model 23 can account for the characteristics of the domain-specific data and target purpose.

According to some embodiments, finetuning a general-purpose, pre-trained NLG model, such as model 21, can save development time and allow more accurate results from smaller training datasets. It can further enable a provider of the pre-trained, general model to serve many customers developing products in different industries and applications.

According to some embodiments, finetuning can be achieved by transfer learning, in which the new model can use training data specific to its purpose or application. As shown in FIG. 2, NLG model 21 can be finetuned with virtual assistant data 24, which can comprise typical request sentences given by users to a virtual assistant. By learning the specific grammatical structures of such typical request sentences, the finetuned NLG model 23 can produce the types of sentences that virtual assistants are likely to receive from users. For a voice-enabled virtual assistant, the training data can be transcriptions of requests. For a text-based virtual assistant, the sentences can be text. For a general-purpose virtual assistant, it can use a broad range of sentences. To finetune for an application-specific virtual assistant, it can be trained by sentences specific to such an application or domain. By doing so, the system would learn the type of phrasings that are used in a particular domain or application.

According to some embodiments, the finetuned NLG model 23 can be unidirectional or bidirectional. A unidirectional model can only read the input from one side to another, while a bidirectional model can read the input from both sides, left-to-right, and right-to-left. For example, the GPT-3 models are unidirectional. Such models can generate sequences of words where each word depends on the previous words in a natural human sentence. Those models can be referred to as left-to-right generators, though they would generate sentences with words in the order written right-to-left if trained for right-to-left written languages such as Hebrew and Arabic. For example, the BERT model is bidirectional, which can work bidirectionally, looking at words to the left and right when predicting words to insert within a sentence.

According to some embodiments, a finetuned NLG model trained by keywords and corresponding sentences can produce correct and meaningful sentences for the intent based on the provided keywords. According to some embodiments, a developer can specify such keywords to define a new intent or enhance the set of sentences that correctly invoke an existing intent. Because the finetuned NLG model learned from a general-purpose NLG model, it can generate correct sentences even if the training never included examples of the keywords for a given intent. Furthermore, some generated sentences that are correct might include none of the keywords used to prime the generation. For example, a finetuned NLG, if given the keywords "rain", "weather", and "date", might generate the sentence "will there be showers tomorrow?" Such generation is because the general-purpose NLG contains knowledge that the word "showers" is related to the words "rain" and "weather," and the word "date" is related to the word "tomorrow".

According to some embodiments, a unidirectional sentence generator, such as GPT-3, can be finetuned on sentences that begin with a set of keywords combined with corresponding sentences. The combining can be achieved by simple concatenation of the keywords before the sentence. For example, an entry in the finetuning training data 24 could be "<KEYWORDS> hotel cheap family <SENTENCE> find me cheap hotels that are family-friendly". A model finetuned on that, and other examples with a similar pattern can learn to infer how to generate correct sentences from keywords. As a result, with a set of provided keywords, the finetuned model can generate meaningful sentences. For example, providing the input "<KEYWORDS> rain chance toronto<SENTENCE>", the model might generate sentences such as "what is the chance of rain in Toronto" and "is there a chance for rain in Toronto", etc.

According to some embodiments, the performance of a multi-domain virtual assistant can be further improved with a domain identifier, such as a text label or some other unique code, being combined with the training sentences. For example, the name of a domain may be prepended to keywords prepended to training sentences. As such, the resulting finetuned model can generate domain-specific output sentences. For example, a model trained on sentences with a weather domain identifier and a fast-food ordering identifier will tend to generate sentences with phrases like "will it" and "is there a chance" in response to input of a weather domain identifier and sentences with phrases like "give me" and "i'll have a" in response to input of a fast-food domain identifier.

According to some embodiments, multi-domain virtual assistants, such as general-purpose voice virtual assistants, can also realize the benefits of using domain identifiers or tags. Interpretation of user requests within the wrong domain is a major cause of poor user experience in multi-domain virtual assistants. Training to generate sentences based on a domain tag significantly improves domain selection, user experience, and the market success of products.

Examples discussed above combine keywords with correct sentences by concatenation and specifically prepending keywords to sentences. Another way of combining keywords and sentences for finetuning and generation is by placing the keywords within sentences and using a bidirectional model such as BART. Accordingly, generation would work by inputting keywords, potentially multiple times in different order, and allowing the model to hypothesize whether another word would come between them and, if so, what the word might be. The bidirectional model would repeat that process with a given intermediate sentence until it hypothesizes that no more words would come between other words in the sentence.

As described above, finetuning and sentence generation can require having keywords appropriate for the intent with which generated sentences will be associated. Developers of virtual assistants or a related field can manually specify relevant keywords to invoke intents. However, according to some embodiments, the system can automatically extract keywords from the provided example sentences or utterance sentences.

According to some embodiments, to extract keywords to represent a specific or customized user intent, the system can parse a sentence based on a keyword extraction model. Such a model can learn from linguistic grammar rules and tag words by their part of speech, such as articles, adjectives, nouns, prepositions, adverbs, and verbs. Some parts of speech tend to be more relevant to distinguishing the intent of a sentence. It can also be helpful to tokenize sentences to identify phrases that act as a part of speech. For example, "New York" is a phrase made of two words that, in most uses, can act as a single noun phrase.

According to some embodiments, the keyword extraction model can tokenize and tag the part-of-speech (POS) of words in sentences, such as Spacy. One approach to extracting keywords is to use the nouns, verbs, adjectives, and adverbs from sentences as the keywords to combine with sentences for training. This process of extracting certain POS as keywords and prepending them to each transcript, along with the domain, is not very computationally intensive.

According to some embodiments, in addition to POS-based selection of keywords, the keyword extraction model can select the most important words from sentences. One example of an algorithm for determining word importance is a term frequency-inverse document frequency (TF-IDF) model built from a corpus of general linguistic text or from the text or transcriptions specifically received by a virtual assistant.

According to some embodiments, the system can add synonyms from a thesaurus as keywords. This can help the finetuned NLG model generate likely correct sentences that it might not have otherwise recognized.

According to some embodiments, the system can replace one or more extracted keywords with a placeholder that can represent a specific type of word. There are hundreds of thousands of place names in the world, millions of products that are available for sale on shopping websites, and an infinite number of numbers. Even with an automated approach of using very fast machine-learned models to generate sentences, it would be impractical to generate sentences for "what's the weather in . . . ?" for every place in the world or "send me a . . . " for every product in the world or, "what's the square root of . . . " for every possible number.

According to some embodiments, to support general requests, the system can train on sentences with placeholders for a certain type of word such as a place name, product, or number. For example, training sentences might include the keywords "weather", "rain", and "<PLACE>" along with training sentences such as "what's the weather in <PLACE>" or "will it rain in <PLACE>". Other training sentences might include "<NUMBER><NUMBER>" along with the sentences "what's <NUMBER> plus <NUMBER>". When an NLG model finetuned with placeholder sentences is used to generate sentences, and when given keywords are provided with such placeholders, it can generate sentences with corresponding placeholders. Such sentences can be used to match user request sentences with any words or phrases at the location of the placeholder as long as the words or phrases are identifiable as a type that is appropriate for the placeholder type.

As shown in FIG. 2, based on either manually or automatically generated keywords, the finetuned NLG model 23 can generate a large number of preliminary utterance sentences that can be further filtered or vetted by a classifier model 26. Even a carefully finetuned NLG model based on a well-trained general-purpose NLG model can generate some sentences that do not make sense for a user. For example, based on weather keywords such as "weather," "rain," "day," the finetuned NLG model 23 can generate preliminary utterance sentences such as "will it rain yesterday". This sentence is grammatically correct in English, and "yesterday" is a day. However, it is very unlikely that a virtual assistant user would make such a request since "will it rain" is usually followed by a word that refers to the future, and the word "yesterday" refers to the past.

According to some embodiments, a binary classifier model, e.g., a classifier model 26, can be utilized to remove such incorrect utterance sentences. The binary classifier model can be trained on positive datasets, negative datasets, and unlabeled datasets to predict how likely it is that a generated sentence is correct for a user. As shown in FIG. 2, a finetuned NLG model 23 is finetuned using virtual assistant data 24 from a general-purpose NLG model 21, which was pre-trained on mass linguistic data 22. The finetuned NLG model 23 can generate a large number of preliminary utterance sentences from keywords. A trained binary classifier 26 can calculate the probability that a generated sentence is grammatically or semantically correct. The probability is a correctness score for the preliminary utterance sentence.

According to some embodiments, the binary classifier 26 can further map the plurality of preliminary utterance sentences to supported utterance sentences regarding a specific intent, wherein the supported utterance sentences are known to invoke the customized user intent. According to some embodiments, the supported utterance sentences can be lists of known, frequently used query sentences that have been collected and verified. According to some embodiments, the supported utterance sentences can comprise augmented semantic grammars that are manually created to summarize a large group of similar queries related to one intent. For example, the augmented semantic grammars can comprise placeholders for variable words or phrases to reflect the specific query. As the binary classifier 26 can be trained on the supported utterance sentences to associate them with a specific intent, it can determine and select sample utterance sentences with a high probability, e.g., a score, for being associated with the specific intent.

According to some embodiments, a selector 27 can compare the scores to a threshold, which can be empirically predetermined or dynamically adapted. For example, when the score exceeds the threshold, the system can associate the sentence with intent 25 as a sample utterance sentence. An example of intent 25 can be a customized user intent that invokes one or more defined actions to be performed by the virtual assistant. When the score is lower than the threshold, selector 27 can discard the preliminary utterance sentence as being incorrect. As such, only utterance sentences with a sufficient likelihood can become sample utterance sentences to be associated with the intent 25. Such elimination and selection can provide the benefits of supporting a large number of user expressions with little human effort while avoiding the false-positive triggering of the intent for incorrectly generated utterance sentences.

According to some embodiments, the system can train the classifier model 26 to predict the probability of a generated utterance sentence being correct by finetuning from a pre-trained NLG model such as a transformer. Various transformer models such as XLNET, BART, BERT, or ROBERTA, and their distilled versions can provide sufficient accuracy and acceptable training and inference-time performance for different datasets and applications.

According to some embodiments, the training datasets for the classifier model 26 can comprise both positive datasets and negative datasets of virtual assistant data 24. The positive datasets can comprise supported utterance sentences that have invoked the specific intent from the virtual assistant, and the negative datasets can comprise utterance sentences that have failed to invoke the specific intent. In addition, unlabeled datasets such as random sentences can also be used for the training.

According to some embodiments, the training datasets for the classifier model 26 can comprise foreign language data, e.g., French, Spanish, and Chinese, etc. Training with a foreign language can improve the effectiveness of classifier model 26 in selecting sample utterance sentences in different languages. Similarly, the general-purpose NLG can be trained with the specific foreign language data that it is working with.

According to some embodiments, in addition to or instead of using the binary classifier correctness score, the system can further consider a typical correctness score generated by the finetuned NLG model 23. According to some embodiments, a classifier for a general virtual assistant can be trained to estimate the likelihood of a sentence being correct for any domain or application. According to some embodiments, a domain-specific classifier can be trained to estimate the likelihood of a sentence being correct for a specific domain. According to some embodiments, an intent-specific classifier model can be trained to estimate the likelihood of a sentence being correct for a specific intent, e.g., a customized user intent.

As shown in FIG. 2, the system can configure an interaction model 28 of the virtual assistant with the sample utterance sentences selected by the selector 27 in such a way that the model can support the sample utterance sentences to invoke the customized user intent 25. An example of interaction model 28 can be a voice interaction model capable of handling a user's spoken query by understanding the sample utterance sentences. According to some embodiments, interaction model 28 can be a text interaction model capable of handling textual exchanges between a user and a virtual assistant.

According to some embodiments, the interaction model 28 can be created to implement the logic for implementing responses and actions of the virtual assistant in response to an intent. It can provide a platform interface, e.g., a voice interface, between the user and the virtual assistant. To define the interface, a specific intent can be mapped to a list of the sample utterance sentences.

According to some embodiments, to map out a user's spoken query, the interaction model 28 can incorporate and process information such as wake words, utterances, invocation names, intents, and placeholders. According to some embodiments, the interaction model 28 can interpret the sample utterance sentences and determine the corresponding defined responses or actions corresponding to the specific intent 25.

Figure 3:
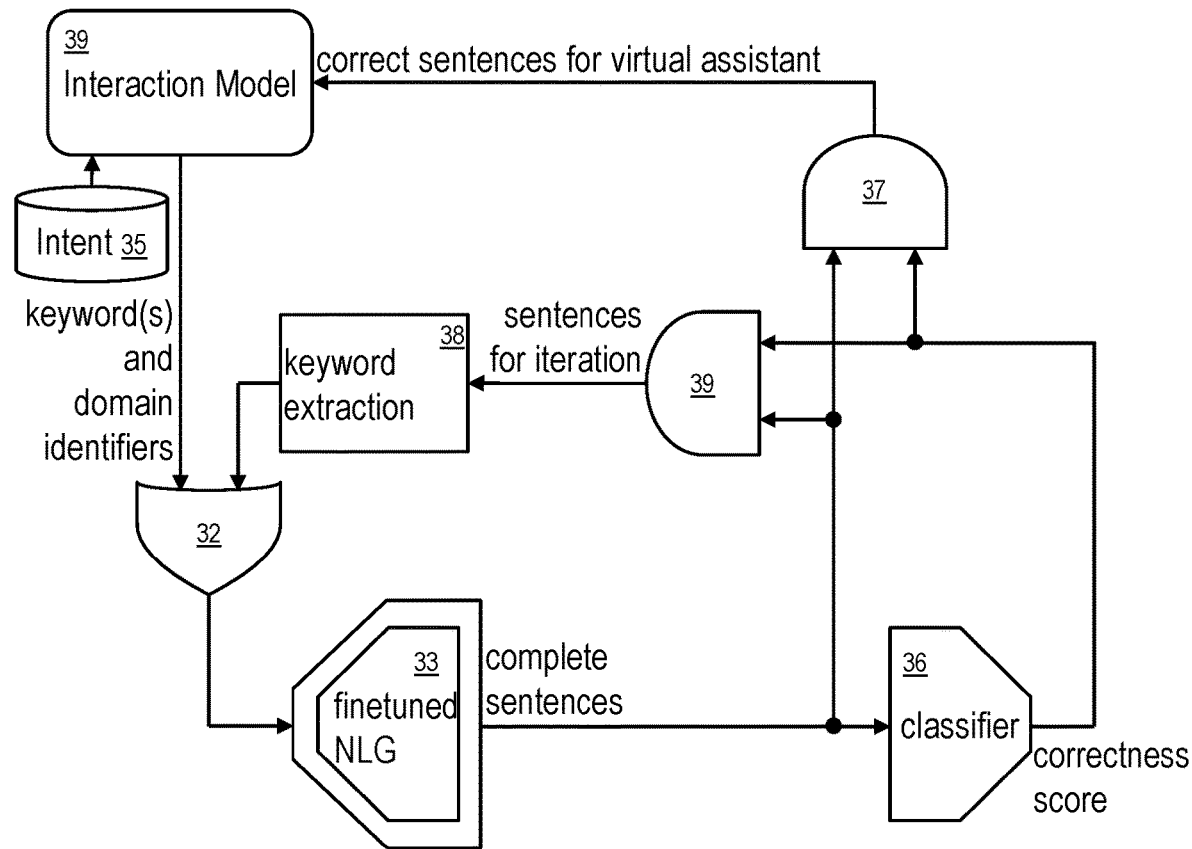
FIG. 3 shows an exemplary diagram of iteratively generating sample utterance sentences to associate with an intent, according to one or more embodiments of the present subject matter.

FIG. 3 shows an exemplary diagram of iteratively generating sample utterance sentences to associate with an intent. According to some embodiments, instead of the keyword-based sentence generation, the system can generate the sample utterance sentences using existing, supported utterance sentences. For example, the finetuned NLG model 33 can use supported utterance sentences or concatenate multiple utterance sentences as inputs and generate sample utterance sentences as outputs. According to some embodiments, the finetuned NLG model 33 can automatically extract domain identifiers and keywords for generating sample utterance sentences. According to some embodiments, the domain identifiers and keyword extraction process can be completed offline in batches in order to prepare the training data, which can reduce the delay caused by keyword extraction in real-time.

With such sentence-to-sentence generation, the system can execute the finetuned NLG model 33 in a loop to generate additional sample utterance sentences and expand the set of correct utterance sentences associated with an intent, as long as they have a sufficiently high likelihood of being correct for a virtual assistant according to the classifier scores. As shown in FIG. 3, the finetuned NLG model 33 can generate preliminary utterance sentences from keywords that are automatically extracted from supported utterance sentences. As described herein, a classifier model 36 can compute correctness scores for the preliminary utterance sentences. A first selector model 37 can select sentences with a correctness score above a correctness threshold to be associated with an intent 35. A second selector model 39 can select sentences with correctness scores above a separate predetermined iteration threshold. According to some embodiments, the second selector model 39 can further map the plurality of preliminary utterance sentences to supported utterance sentences regarding a specific intent, wherein the supported utterance sentences are known to invoke the customized user intent. According to some embodiments, the supported utterance sentences can be lists of known, frequently used query sentences that have been collected and verified. According to some embodiments, the supported utterance sentences can comprise augmented semantic grammars that are manually created to summarize a large group of similar queries related to one intent. As the second selector model 39 can be trained on the supported utterance sentences to associate them with a specific intent, it can determine and select sample utterance sentences with a high probability, e.g., a score, for being associated with the specific intent.

A keyword extraction model 38 can extract keywords from the high-scoring sentences meeting the iteration threshold. A third selector model 32 can use either keywords and domain identifiers manually associated with the intent or automatically extracted keywords to generate additional sample utterance sentences. Next, the generated combined sample utterance sentences can be further scored by a classifier model to choose the highest-scoring ones as the sample utterance sentences for a specific intent.

As shown in FIG. 3, the system can configure an interaction model 39 with the sample utterance sentences selected by the selector 37 in such a way that the model can support the sample utterance sentences to invoke the customized user intent 35. An example of the interaction model 38 can be a voice interaction model capable of handling a user's spoken query by understanding the sample utterance sentences. According to some embodiments, interaction model 38 can be a text interaction model capable of handling textual exchanges between a user and a virtual assistant.

According to some embodiments, the interaction model 39 can incorporate and process information such as wake words, utterances, invocation names, intents, and placeholders, all of which are used to map out a user's spoken query. According to some embodiments, the interaction model 39 can interpret the sample utterance sentences and determine the corresponding defined responses or actions corresponding to the specific intent 35.

Figure 4:
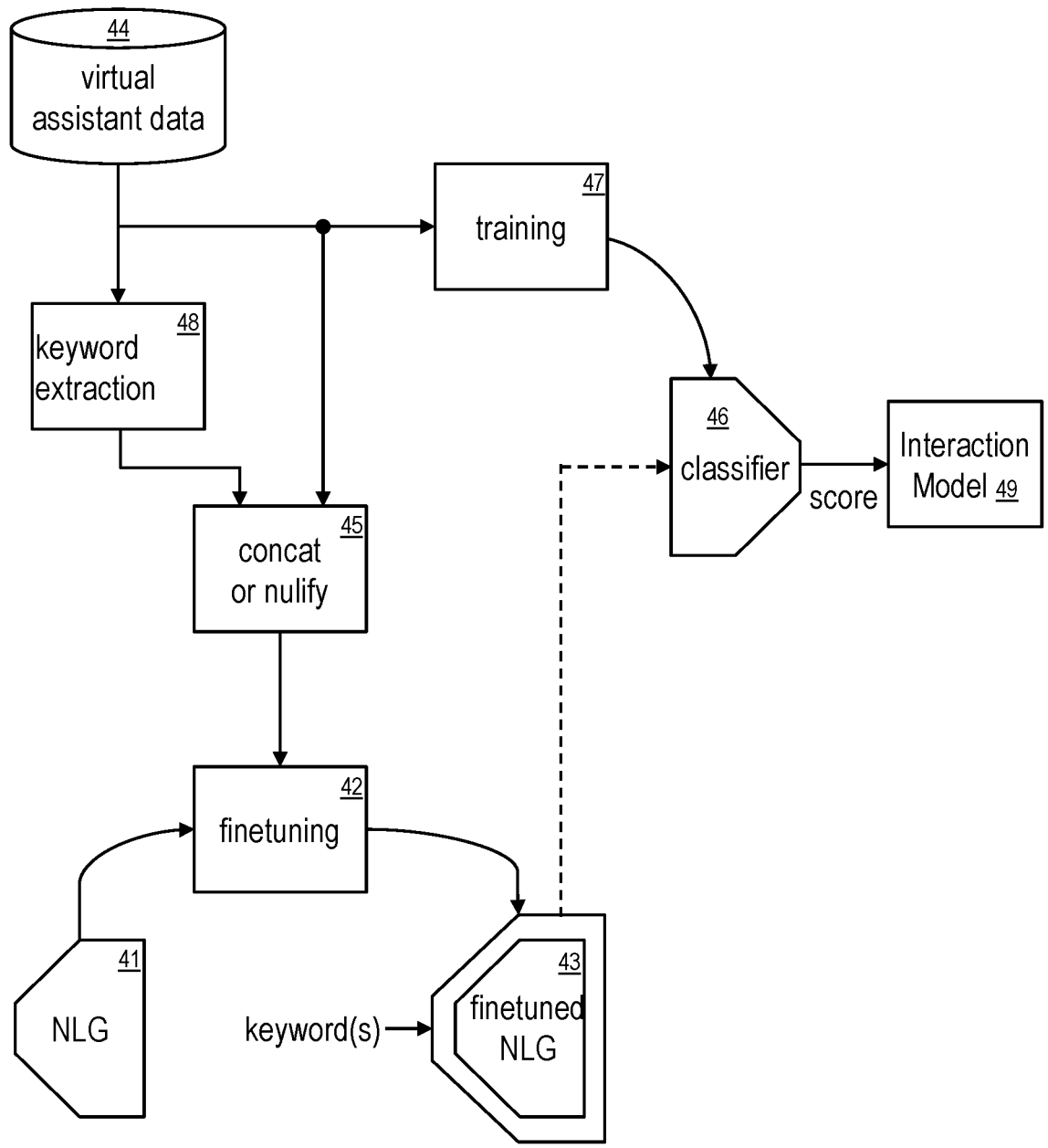
FIG. 4 shows an exemplary diagram of finetuning a sentence generation model and a correctness classifier, according to one or more embodiments of the present subject matter.

FIG. 4 shows an exemplary diagram of finetuning a sentence generation model 41 and a correctness classifier 46. It is an example of the training of the models for the generation of sample utterance sentences for an intent. The training can use a general-purpose NLG model 41 and finetune it 42 to create a finetuned NLG model 43. The finetuned LG model 43 can generate preliminary utterance sentences from keywords. The finetuning can use training sentences combined with keywords. The keywords can be combined with training sentences through concatenation 45 for a unidirectional generator model. Alternatively, keywords can be selected, and the unselected words can be nullified for training a bidirectional model to infer words among keywords in sentences. The keywords can be extracted or identified 48 from the known, supported utterance sentences associated with an intent. The training sentences can be obtained from a corpus of virtual assistant data 44. That can include the text or transcriptions of speech from user requests and indications of whether the requests cause the virtual assistant to give a correct or incorrect response. The training corpus can also include unlabeled sentences and sentences that are not from requests to virtual assistants at all. The corpus of training sentences, labeled as one of the positive examples, negative examples, or unlabeled examples, can be used for training 47 to create a binary classifier 46. The binary classifier 46 can infer the probabilities of sentences generated by the finetuned NLG model 43 as being correct.

As shown in FIG. 4, the system can configure an interaction model 49 with the sample utterance sentences selected by binary classifier 46 so that the model can support the sample utterance sentences to invoke the customized user intent. An example of the interaction model 38 can be a voice interaction model.

An owner of an appropriate sentence generator can offer it as a web service through an application programming interface (API). Such an offering can be useful, for example, for a company to provide the service of generating sentences to another company. For example, a provider of a server platform for implementing virtual assistants for various devices may allow a device developer to send sentences to an API and get back other sentences that are likely to have the same intent. By doing so, the device developer can review the generated sentences to see if they are correct for the developer's client device.

Figure 5A:
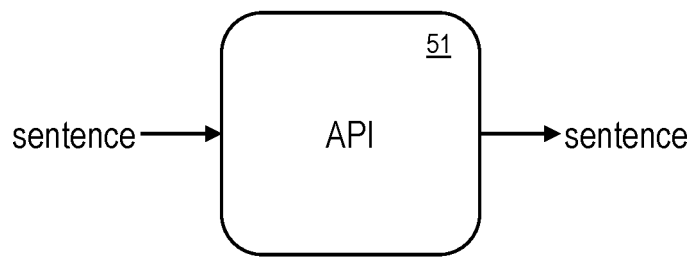
FIG. 5A shows an exemplary API for generating sample utterance sentences with the same intent as the input utterance sentences, according to one or more embodiments of the present subject matter.

FIG. 5A shows an exemplary API 51 for generating sample utterance sentences with the same intent as the input utterance sentences. The API 51 can receive supported input utterance sentences as an API request or input, invoke an NLG model finetuned for a virtual assistant, generate one or more sample sentences with a high probability of having the same intent, and returns those sentences as a response or output from the API. According to some embodiments, an keyword extraction model associated with the API 51 can extract keywords from the input utterance sentences as the input for the API 51.

Figure 5B:
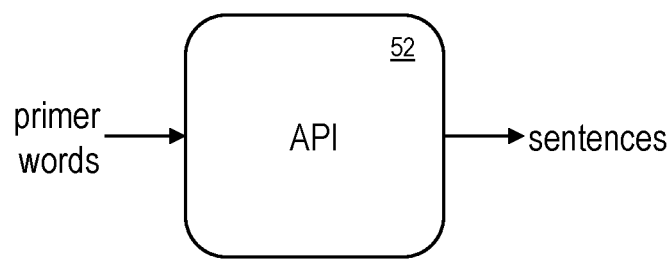
FIG. 5B shows an exemplary API for generating sample utterance sentences for intents indicated by keywords, according to one or more embodiments of the present subject matter.

FIG. 5B shows an exemplary API 52 for generating sample utterance sentences for intents indicated by keywords. According to some embodiments, the primer words can be manually compiled by developers. According to some embodiments, the developer can review the generated preliminary utterance sentences and select ones that are appropriate as sample utterance sentences. According to some embodiments, the primer words can be automatically generated and selected by neural network models, as described herein.

Figure 5C:
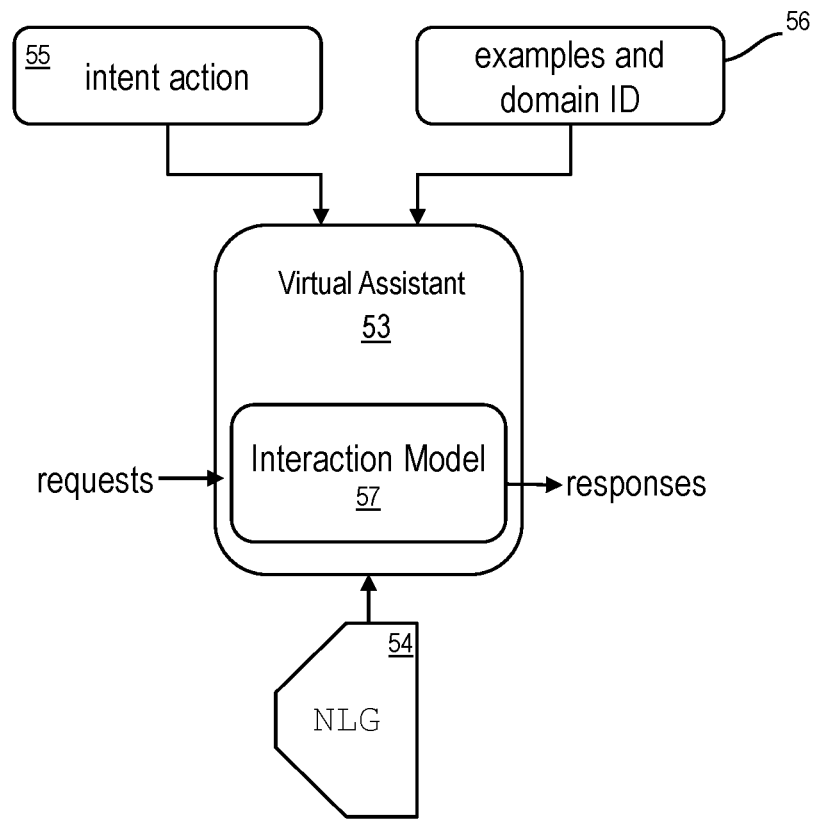
FIG. 5C shows an exemplary developer-configurable virtual assistant having NLG, according to one or more embodiments of the present subject matter.

FIG. 5C shows an exemplary developer-configurable virtual assistant 53 having NLG. The virtual assistant 53 can be a software agent configurable to enable client devices to send a user's spoken requests to APIs, interpret the requests according to the most likely intent, fulfill the request with a query answer or command action, and provide a response accordingly. The virtual assistant 53 can comprise an interaction model 57 to implement these aforementioned procedures.

As shown in FIG. 5C, the virtual assistant 53 can receive user requests from clients and provides responses to the clients for the users. The virtual assistant 53 can support natural language requests using a specially finetuned NLG model based on a general-purpose NLG model 54. Such a model may be an open language model such as BART, GPT-3, a proprietary one, or one that is purchased or leased.

According to some embodiments, a developer can configure a platform interface, i.e., the interaction model 57, to define the logic for fulfilling a user request corresponding to an intent action 55, including, for example, the wake words, intents, sample utterances, placeholders, and actions. According to some embodiments, the developer can provide the keywords, examples and domain identifiers 56 to interaction model 57.

Figure 6:
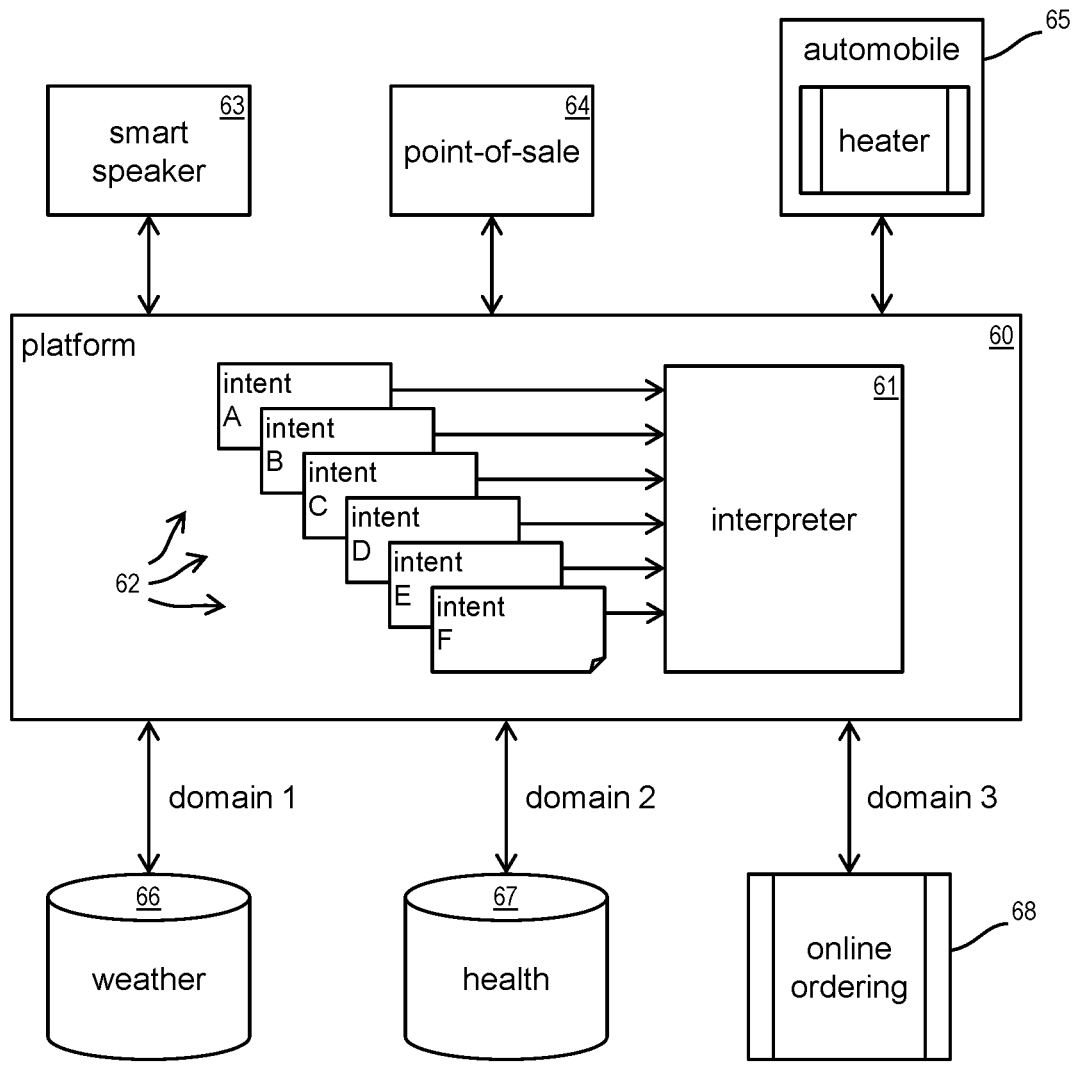
FIG. 6 shows an exemplary virtual assistant platform and ecosystem, according to one or more embodiments of the present subject matter.

FIG. 6 shows an exemplary virtual assistant platform and ecosystem. According to some embodiments, client devices with virtual assistants, such as music playing systems, ordering systems, or personal robots, can implement their own functions through APIs. To serve their users, they can send natural language requests to an appropriately trained virtual assistant platform or server, which can perform an API call to the client device system.

According to some embodiments, content providers can provide virtual assistant access via an API. Examples of such content providers can be weather providers, recipe providers, sport score providers, and stock price providers. Upon requests from the client, the virtual assistant can invoke their API to, for example, retrieve information needed from the content provider and provide it to the client.

For such device makers or content providers, it can be burdensome to create sample utterance sentences or even keywords appropriate to each of potentially many types of requests that their APIs can handle. Such providers typically have documentation of their APIs with narrative descriptions of the functions invoked by the various arguments that the API can accept. Such providers generally have some kind of API call template showing the type and appropriate order of arguments.

A virtual assistant provider can greatly improve user access to the various functions available through an API by extracting keywords from the narrative descriptions of API functions and the meaning of arguments. Using those keywords, the virtual assistant system can use an NLG model to generate correct sentences for a virtual assistant to invoke the functions and arguments. The system can then automatically map, to the API or another type of corresponding function call, the generated sample utterance sentences such that requests to the virtual assistant matching the generated sentences invoke a call of the function with the appropriate argument values in response to any related user request.

With such a method, a keyword, for the purpose of training, can be a variable, as shown in the API documentation. For example, a weather API may provide weather forecasts for a given location name. The sentence generation process may see <LOCATION> in the API documentation and automatically invoke placeholder keywords in the sentence generation.

As shown in FIG. 6, a virtual assistant platform can give client developers, or content providers access to view the generated sentences and check that they correspond to intents as expected. Client developers or content providers can delete sentences generated incorrectly. The deleted sentences can be used as example negative training data to further finetune a domain-specific or intent-specific NLG model and/or a correctness classifier.

Using systems such as the examples described above, a virtual assistant provider can offer a platform that provides many diverse sources of content and actions to a diverse range of clients. Having more clients creates more opportunities for content providers to take benefit from their content. Having more content available enables client developers to offer greater functionality and experiences to users. Furthermore, the content of one domain can be used to assist in requests for another domain. These features together create a system of collective artificial intelligence for the benefit of all users.

FIG. 6 shows a diagram of such an ecosystem. A virtual assistant platform 60 can include functionality to interpret natural language requests 61. The interpreter 61 can receive incoming natural language requests and interpret them in relation to sentences that correspond to many intents 62 that the virtual assistant is able to handle.

A client device such as a smart speaker 63 in a person's home or a point-of-sale device 64 can respond to the types of requests that they expect. The developers of such clients can configure platform 60 for their clients to handle appropriate requests. For example, the smart speaker 63 can handle requests to turn off the lights, but a point-of-sale device can not support such a function.

According to some embodiments, some client devices can include their own functionality. For example, a client that is an automobile 65 may have a heater. To enable drivers or passengers of the automobile 65 to control the heater using natural language, platform 60 can receive natural language requests, interpret them according to an intent that corresponds to controlling a heater, and send a response to the automobile with information instructing its heater to turn on or off.

According to some embodiments, client developers can configure their own one or more domains with their own domain-specific intents, each with its own sentences. Platform 60 can also offer general-purpose domains and intents. Furthermore, providers of content and functionality can have their own domains with associated intents, each having its own associated sentences to invoke the intent.

For example, a weather data provider 66 can answer queries about the current weather in a specified location, the forecast for the next day, the 10-day forecast, weather alerts, the humidity level, the temperature, the wind speed, and other similar queries. The weather content provider can provide keywords, example sentences, and/or API documentation to the platform, which can generate linguistically correct sentences for virtual assistant users to access weather data. Similarly, a provider of health information 67 can provide information to answer queries such as what are the symptoms of malaria, how to measure a pulse, and what is my doctor's home phone number.

According to some embodiments, some domain providers can offer actions in response to user commands rather than information in response to user queries. An online ordering provider 68 can provide keywords, example sentences, or API documentation to the platform 60 for commands such as searching for a specific kind of item, checking prices, putting an item into a virtual shopping cart, entering a credit card number, and placing an order for delivery.

Figure 7:
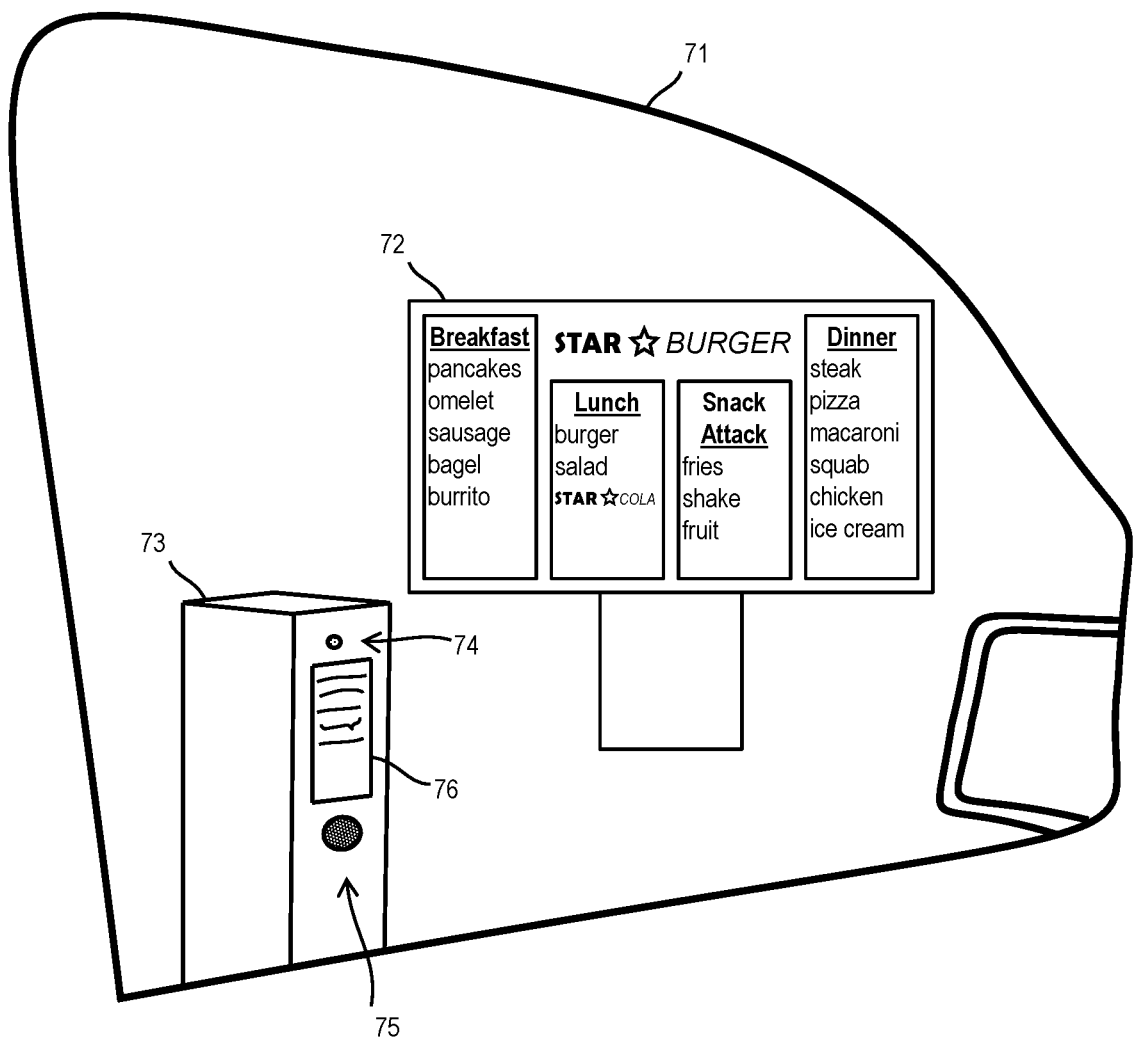
FIG. 7 shows a fast food ordering scenario with a virtual assistant, according to one or more embodiments of the present subject matter.

FIG. 7 shows a fast food ordering scenario with virtual assistants, which shows a scenario of a user interaction with a virtual assistant. For example, the driver can pull into the drive-through lane of a hamburger fast-food restaurant. Through the driver's side window 71, the driver can review a menu of food items 72. The driver can then interact with a voice-enabled ordering pole 73. A fast-food ordering pole 73 is a type of point-of-sale device. The pole can comprise a microphone 74 for receiving voice requests from the driver, a speaker 75 for providing synthesized voice responses to the driver's requests, and a display 76 with text to show the driver's order.

As shown in FIG. 7, the driver can initiate an order by speaking a trigger or wake phrase such as "hi", "hey", or "hello". The system can respond by soliciting the driver's order. The driver can then invoke intents such as adding an item to an order with a sentence such as "i'll have a hamburger" or "give me a burger". The driver can invoke an intent to look up nutrition information with a sentence such as "how many calories are in a shake" or "is a shake fattening". The driver can inquire about the bill with a sentence such as "how much does all that cost" or "what's the total".

The ordering pole 73 can send the voice audio through a request to a virtual assistant API. Upon receiving the voice audio, the virtual assistant system can transcribe the audio to text and search a list of sample utterance sentences associated with intents. If the transcribed sentence does not match any sample sentence in the list, the virtual assistant provides an error response to the API request. If the transcribed sentence matches a stored sample utterance sentence, the virtual assistant can determine what intent is associated with the sentence. It can then fulfill the specific action defined by the intent. The specific action can be, for example, sending a request to another API that collects fast food orders to dispatch to service windows. The virtual assistant can also provide an acknowledgment response. When the request is for information, the virtual assistant can look up the information and respond accordingly.

Since storing all possible sample utterance sentences for all intents of a general-purpose virtual assistant platform can require a lot of storage and/or a lot of time to search, some systems can take the received request sentence, extract keywords, search a list of keywords to find the possible intents, and then in real-time perform sentence generation either from known intent sentences to match the received sentence or on the received sentence to compare to known intent sentences. If the virtual assistant finds a matching, it can fulfill the associated intent.

Figure 8:
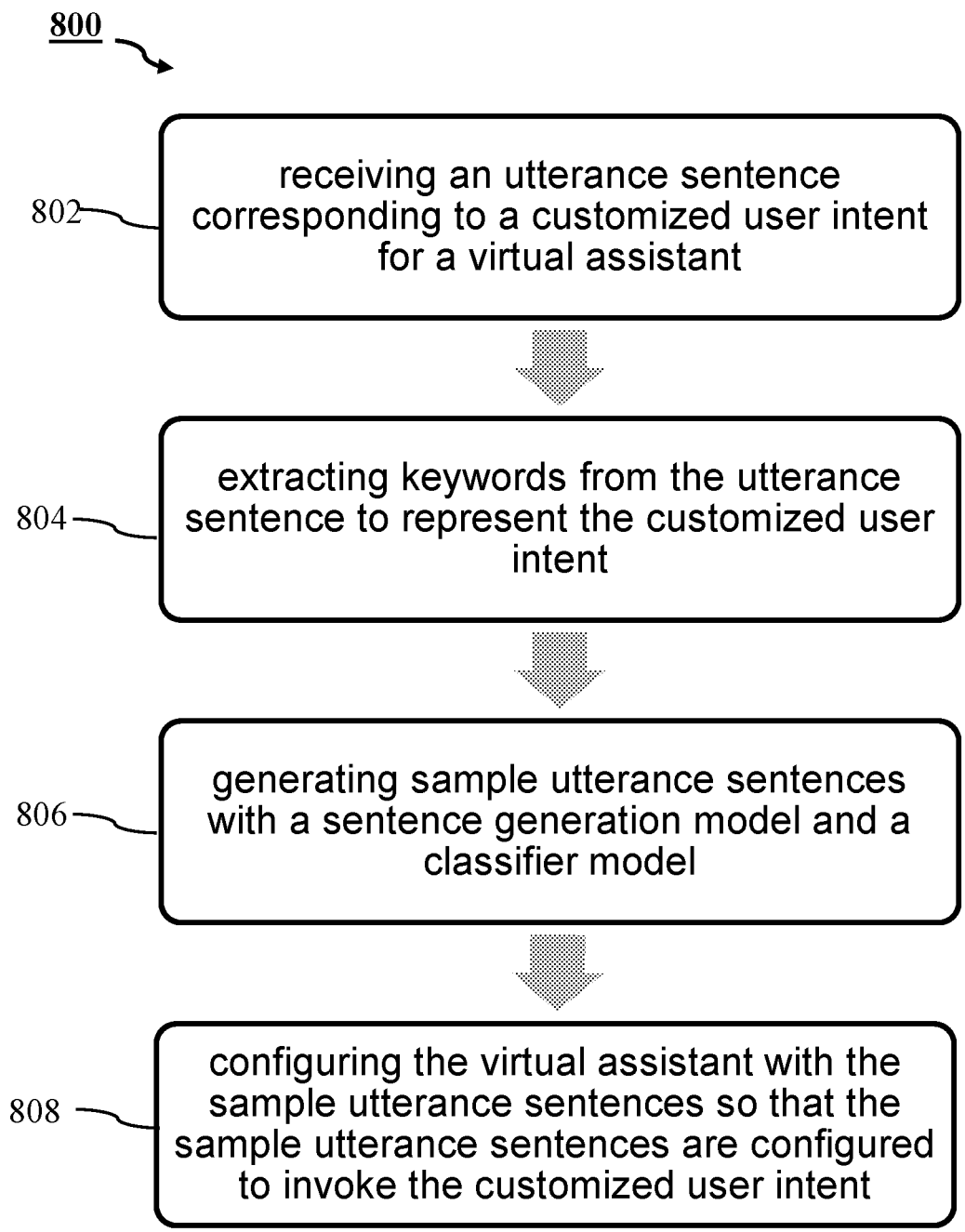
FIG. 8 shows an exemplary process of automatically generating sample utterance sentences with a neural sentence generator, according to one or more embodiments of the present subject matter.

FIG. 8 shows an exemplary process 800 of automatically generating sample utterance sentences with a neural sentence generator. At step 802, the virtual assistant system can receive an utterance sentence corresponding to a customized user intent for a virtual assistant. According to some embodiments, the utterance sentence can be a known supported utterance sentence with a correctness score above a threshold. According to some embodiments, the utterance sentence can comprise one or more spoken phrases that a user can speak to invoke the customized user intent. According to some embodiments, the customized user intent can invoke one or more defined actions to be performed by the virtual assistant.

At step 804, the virtual assistant system can extract one or more keywords from the utterance sentence to represent the customized user intent. According to some embodiments, a keyword extraction model can extract the keywords that represent the customized user intent. According to some embodiments, the system can replace one or more keywords with a placeholder representing a specific type of word for more efficient data processing.

At step 806, the virtual assistant system can generate sample utterance sentences with a sentence generation model and a classifier model. According to some embodiments, the system can first generate, via a sentence generation model, preliminary utterance sentences based on the extracted keywords. According to some embodiments, the sentence generation model is a general-purpose natural language generation model that has been finetuned by associated data. For example, the general-purpose natural language generation model can be finetuned by keywords combined with corresponding utterance sentences. It can also be finetuned by domain-specific datasets and/or domain identifiers. According to some embodiments, the sentence generation model can be unidirectional or bidirectional.

According to some embodiments, the system can generate, via a classifier model, sample utterance sentences corresponding to the customized user intent based on the preliminary utterance sentences. According to some embodiments, the classifier model can be trained by at least one of positive datasets, negative datasets, and unlabeled datasets. The positive datasets can comprise supported utterance sentences combined with the customized user intent, and wherein the supported utterance sentences can invoke the customized user intent.

According to some embodiments, the trained classifier model can infer probabilities of the correctness of the preliminary utterance sentences for invoking the customized user intent.

According to some embodiments, the trained classifier model can compute correctness scores for the preliminary utterance sentences and select a plurality of preliminary utterance sentences with correctness scores higher than a threshold. According to some embodiments, the trained classifier model can further map the selected plurality of preliminary utterance to the customized user intent to generate the sample utterance sentences, wherein the classifier model has been trained by supported utterance sentences that are known to invoke the customized user intent. According to some embodiments, the sample utterance sentences are domain-specific.

At step 808, the virtual assistant system can configure the virtual assistant with the sample utterance sentences so that the sample utterance sentences can invoke the customized user intent. For example, the configured virtual assistant can recognize a user query matching with one of the provided sample utterance sentences and generate the corresponding responses or actions.

Figure 9:
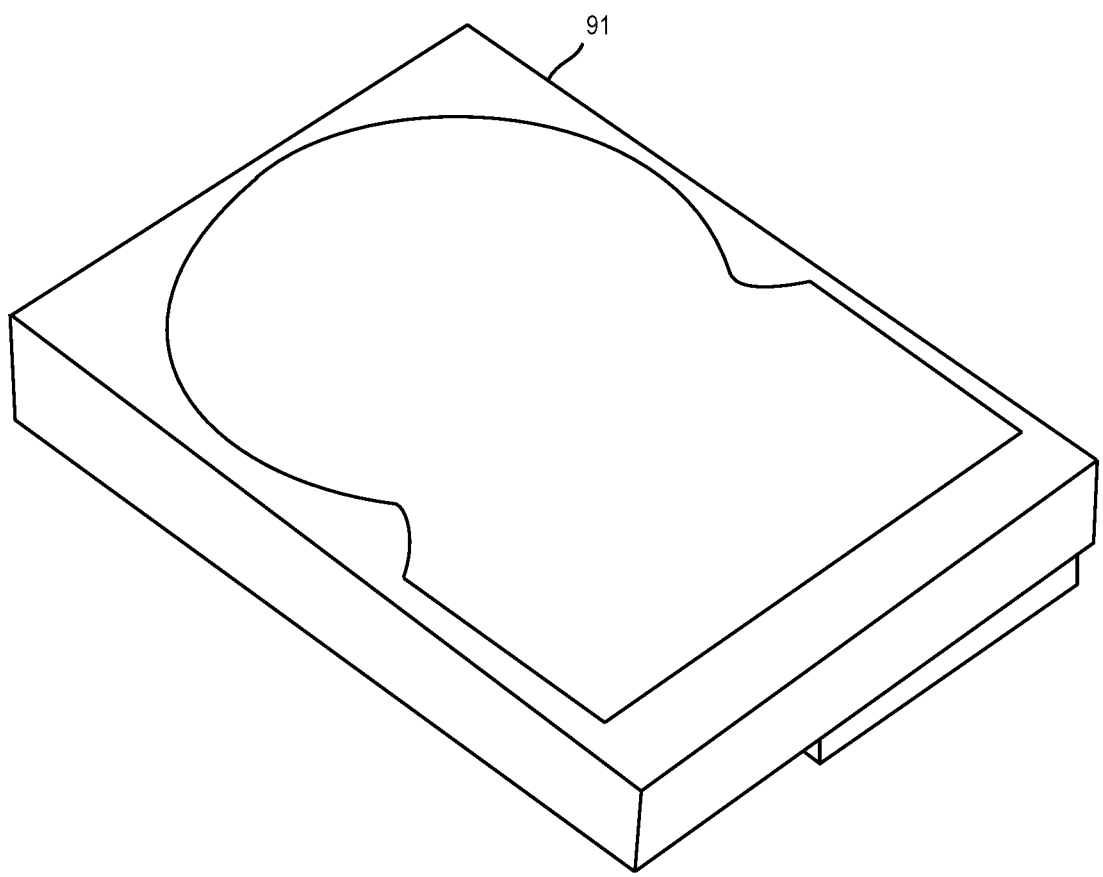
FIG. 9 shows a hard drive, which is an example of a non-transitory computer-readable medium, according to one or more embodiments of the present subject matter.

FIG. 9 shows a hard drive, which is an example of a non-transitory computer-readable medium. Various examples are implemented with non-transitory computer-readable media. FIG. 9 shows an example of a non-transitory computer-readable medium 91, a rotating magnetic disk drive. Data centers commonly use magnetic disks to store data and code comprising instructions for server processors. Non-transitory computer-readable medium 91 stores code comprising instructions that, if executed by one or more computers, would cause the computer to perform steps of methods described herein. Rotating optical disks and other mechanically moving storage media are possible. Furthermore, stationary storage media such as flash chips and solid-state drives can also store instructions as needed.

Figure 10A:
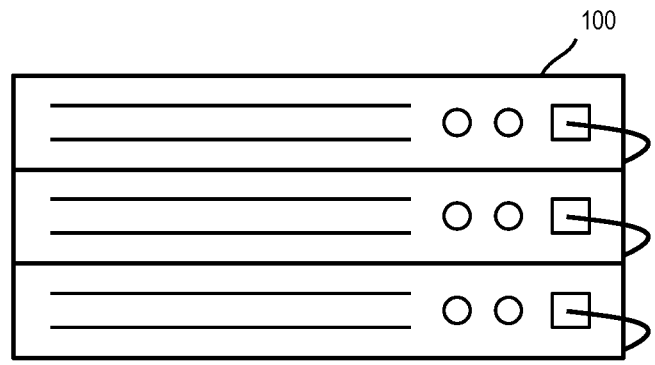
FIG. 10A shows a server system of rack-mounted blades, according to one or more embodiments of the present subject matter.

FIG. 10A shows a server system of rack-mounted blades. Various examples are implemented with cloud servers, such as ones implemented by data centers with rack-mounted server blades. FIG. 10A shows a rack-mounted server blade multi-processor server system 100. Server system 100 comprises a multiplicity of network-connected computer processors that run software in parallel.

Figure 10B:
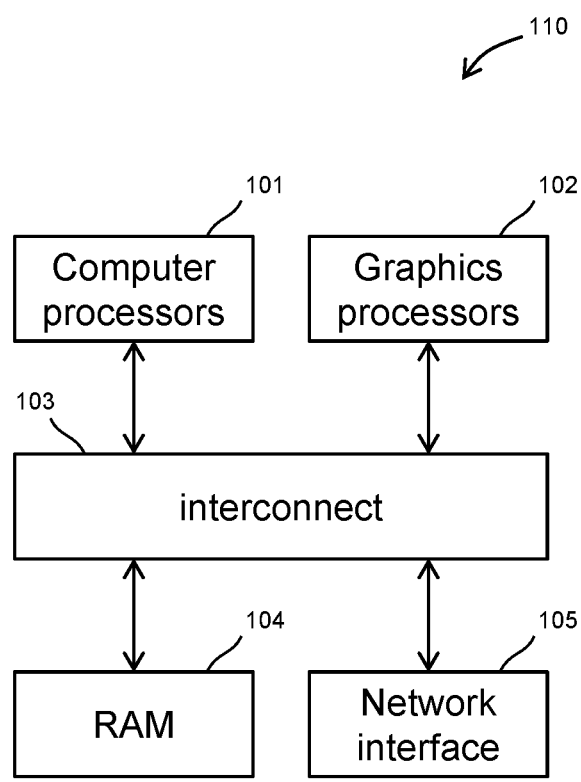
FIG. 10B shows a diagram of a networked data center server, according to one or more embodiments of the present subject matter.

FIG. 10B shows a diagram of a networked data center server 110. It comprises a multicore cluster of computer processor (CPU) cores 101 and a multicore cluster of the graphics processor (GPU) cores 102. The processors connect through a board-level interconnect 103 to random-access memory (RAM) devices 104 for program code and data storage. Server system 100 also comprises a network interface 105 to allow the processors to access the Internet, non-volatile storage, and input/output interfaces. By executing instructions stored in RAM devices 104, the CPUs 101 and GPUs 102 perform steps of methods described herein.

Examples shown and described use certain spoken languages. Various embodiments work, similarly, for other languages or combinations of languages. Examples shown and described use certain domains of knowledge and capabilities. Various systems work similarly for other domains or combinations of domains.

Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens.

Some systems function by running software on general-purpose programmable processors (CPUs) such as ones with ARM or x86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Hardware blocks, custom processor instructions, co-processors, and hardware accelerators perform neural network processing or parts of neural network processing algorithms with especially high performance and power efficiency. This enables extended battery life for battery-powered devices and reduces heat removal costs in data centers that serve many client devices simultaneously.

Several aspects of one implementation of the neural sentence generator and its applications are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method for virtual assistants, comprising:
    receiving an utterance sentence corresponding to a customized user intent for a virtual assistant;
    extracting one or more keywords from the utterance sentence to represent the customized user intent;
    generating, via a sentence generation model, preliminary utterance sentences based on the one or more keywords;
    training a binary classifier model with supported utterance sentences that are known to invoke the customized user intent;
    computing, via the binary classifier model, correctness scores for the preliminary utterance sentences based on probability of whether a preliminary utterance sentence is grammatically or semantically correct;
    selecting a plurality of preliminary utterance sentences with correctness scores higher than a threshold;
    generating, via the binary classifier model, sample utterance sentences corresponding to the customized user intent based on the plurality of preliminary utterance sentences by mapping the plurality of preliminary utterance sentences to the supported utterance sentences that are known to invoke the customized user intent; and
    configuring a voice interaction model of the virtual assistant with the sample utterance sentences, wherein the sample utterance sentences are supported by the voice interaction model to invoke the customized user intent.

2. The computer-implemented method of claim 1, wherein the utterance sentence comprises one or more spoken phrases that a user can speak to invoke the customized user intent, and wherein the customized user intent invokes one or more defined actions to be performed by the virtual assistant.

3. The computer-implemented method of claim 1, wherein extracting one or more keywords from the utterance sentence is based on a keyword extraction model.

4. The computer-implemented method of claim 1, further comprising:
    replacing at least one keyword with a placeholder representing a specific type of word.

5. The computer-implemented method of claim 1, wherein the sentence generation model is a general-purpose natural language generation model finetuned by associated keywords combined with corresponding utterance sentences.

6. The computer-implemented method of claim 1, wherein the sentence generation model is a general-purpose natural language generation model finetuned by domain-specific datasets.

7. The computer-implemented method of claim 1, wherein the sentence generation model is a general-purpose natural language generation model finetuned by domain identifiers.

8. The computer-implemented method of claim 1, wherein the binary classifier model is trained by at least one of positive datasets, negative datasets, and unlabeled datasets.

9. The computer-implemented method of claim 8, wherein the positive datasets comprise supported utterance sentences combined with the customized user intent, and wherein the supported utterance sentences are configured to invoke the customized user intent.

10. The computer-implemented method of claim 1, further comprising:
mapping, via the binary classifier model, the selected plurality of preliminary utterance sentences to the customized user intent to generate the sample utterance sentences.

11. A computer-implemented method for virtual assistants, comprising:
receiving an utterance sentence corresponding to an intent for a virtual assistant;
extracting one or more keywords from the utterance sentence to represent the intent;
generating, via a sentence generation model, preliminary utterance sentences based on the one or more keywords;
training a binary classifier model with supported utterance sentences that are known to invoke the customized user intent;
computing, via the binary classifier model, correctness scores for the preliminary utterance sentences based on probability of whether a preliminary utterance sentence is grammatically or semantically correct;
selecting a plurality of preliminary utterance sentences with correctness scores higher than a threshold;
generating sample utterance sentences based on the plurality of preliminary utterance sentences by mapping the plurality of preliminary utterance sentences to the supported utterance sentences that are known to invoke the customized user intent, wherein the sample utterance sentences are generated by the sentence generation model and selected by the binary classifier model; and
configuring the virtual assistant with the sample utterance sentences, wherein the sample utterance sentences are configured to invoke the intent.

12. The computer-implemented method of claim 11, wherein the virtual assistant further comprises a voice interaction model that supports the sample utterance sentences to invoke the intent.

13. The computer-implemented method of claim 11, wherein extracting one or more keywords from the utterance sentence is based on a keyword extraction model.

14. The computer-implemented method of claim 11, further comprising:
replacing at least one keyword with a placeholder representing a specific type of word.

15. The computer-implemented method of claim 11, wherein the sentence generation model is a general-purpose natural language generation model finetuned by relevant datasets comprising one or more of associated keywords combined with corresponding utterance sentences, domain-specific datasets, and domain identifiers.

16. The computer-implemented method of claim 11, wherein the binary classifier model is trained by at least one of positive datasets, negative datasets, and unlabeled datasets.

17. The computer-implemented method of claim 16, wherein the positive datasets comprise supported utterance sentences combined with the intent, and wherein the supported utterance sentences are known to invoke the intent.

18. The computer-implemented method of claim 11, further comprising:
mapping, via the binary classifier model, the plurality of preliminary utterance sentences to the intent to generate the sample utterance sentences.

19. A computer-implemented method for virtual assistants, comprising:
obtaining one or more keywords associated with an utterance sentence corresponding to a customized user intent for a virtual assistant;
generating, via a sentence generation model, preliminary utterance sentences based on the one or more keywords;
training a binary classifier model with supported utterance sentences that are known to invoke the customized user intent;
computing, via the binary classifier model, correctness scores for the preliminary utterance sentences based on probability of whether a preliminary utterance sentence is grammatically or semantically correct;
selecting a plurality of preliminary utterance sentences with correctness scores higher than a threshold;
generating sample utterance sentences based on the plurality of preliminary utterance sentences by mapping the plurality of preliminary utterance sentences to the supported utterance sentences that are known to invoke the customized user intent, wherein the sample utterance sentences are generated by the sentence generation model and selected by the binary classifier model; and
configuring the virtual assistant with the sample utterance sentences, wherein the sample utterance sentences are configured to invoke the intent.

20. The computer-implemented method of claim 19, wherein the one or more keywords are extracted from the utterance sentence that is known to invoke the intent by a keyword extraction model.

21. The computer-implemented method of claim 19, wherein the one or more keywords are specified by a developer from the utterance sentence that is known to invoke the intent.

22. The computer-implemented method of claim 19, wherein the sentence generation model is a general-purpose natural language generation model finetuned by relevant datasets comprising one or more of associated keywords combined with corresponding utterance sentences, domain-specific datasets, and domain identifiers.

23. The computer-implemented method of claim 19, further comprising:
mapping, via the binary classifier model, the plurality of preliminary utterance sentences to the intent to generate the sample utterance sentences.

* * * * *